UNITED STATES PATENT OFFICE.

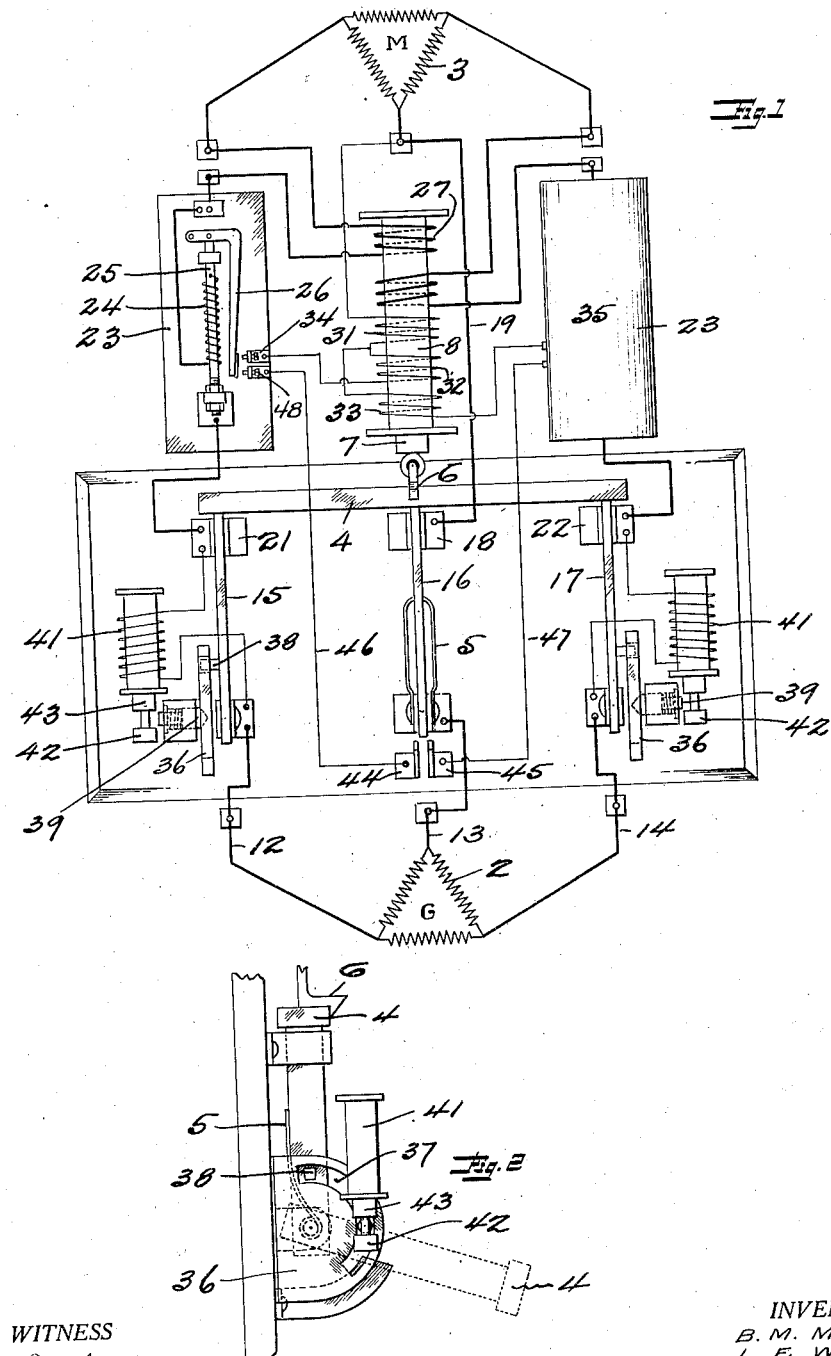

BENJAMIN M. MOOERS, OF SAN FRANCISCO, AND LAWRENCE E. WARNER, OF BERKELEY, CALIFORNIA, ASSIGNORS TO MOTOR PROTECTOR MANUFACTURING COMPANY, OF SAN FRANCISCO, CALIFORNIA, A CORPORATION OF CALIFORNIA.

ELECTRIC CONTROL SYSTEM.

1,381,580.   Specification of Letters Patent.   Patented June 14, 1921.

Application filed June 9, 1917. Serial No. 173,752.

*To all whom it may concern:*

Be it known that we, BENJAMIN M. MOOERS and LAWRENCE E. WARNER, citizens of the United States, and residents, respectively, of the city and county of San Francisco and of Berkeley, Alameda county, both in the State of California, have invented a certain new and useful Electric Control System, of which the following is a specification.

The invention relates to electric control systems and particularly to systems which operate to open the electric circuit when the heating effect of the current therein approaches a dangerous value.

An object of the invention is to provide a device which operates to open an electric circuit containing electric device when the temperature of such device or certain portions due to current flow thereof approaches a predetermined value.

Another object of the invention is to provide means for preventing the closing of the circuit after it has been automatically opened, until the temperature of the device falls to a lower degree.

The invention possesses other advantageous features, some of which, with the foregoing, will be set forth at length in the following description where we shall outline in full that form of the invention which we have selected for illustration in the drawings accompanying and forming part of the present specification. In said drawings we have shown one specific embodiment of our generic invention, but it is to be understood that the invention as expressed in the claims may be embodied in a plurality of forms.

Referring to said drawings:

Figure 1 is a diagrammatic representation of the system of our invention.

Fig. 2 is a side elevation of the switch lock-out means shown in Fig. 1.

Devices have heretofore been employed for releasing or opening a switch in an electric circuit containing electric device, when the temperature of the apparatus or a portion thereof reached a predetermined maximum, thereby precluding further current flow to the apparatus. Frequently, however, after the switches have been opened, operators have closed them before the apparatus has cooled and have forcibly held the switches in, so that the protective device could not operate and have thereby caused the apparatus or the windings thereof to burn out. An object of our invention, therefore, is to provide means which prevents the switch from being closed until the temperature of the apparatus or a part thereof has dropped to such lower value that it will not be deleteriously affected by the closing of the circuit.

The protective device of this invention is usualy arranged on a switch board or at some other point remote from the apparatus being protected and is preferably so constructed that its temperature varies directly with the temperature of a selected portion of the protected apparatus, or that part of a conductor in an apparatus which has the least heat emissivity but such direct temperature variation is not essential. The protective device is arranged in the circuit connected to the electrical apparatus and includes a conductor which is preferably arranged in series in the circuit, and when direct termperature variation is desired the heating conductor is preferably heat-insulated in substantially the same degree as those conductors in the electrical apparatus which have the least heat emissivity, so that the temperature of the device always corresponds to the high temperature which exists in the apparatus. When a temperature is reached in the protective device which corresponds to an abnormal or destructive temperature within the apparatus, the device operates to open the circuit.

In the drawings we have shown the invention as applied to protecting a three-phase motor, but it is to be understood that the invention is applicable to direct current or to alternating current of one or more phases. Current is derived from the alternating current generator 2 and is supplied to the alternating current motor 3, which is protected against overheating by the system of our invention. A three-blade switch 4 is arranged in the circuit, the blades being insulated from each other and the switch being provided with a spring 5, which operates to open the switch. The switch is held in the closed position by the latch 6 which is attached to the core 7 of the solenoid 8, so that when the solenoid is energized, the latch is lifted and the switch flies open. The three supply leads 12, 13, 14, are connected to the pivot supports of the three blades 15, 16, 17, and the contact clip 18 of the central blade is connected directly to the motor 3 by the conductor 19. The contact clips 21 and 22 of the blades 15 and 17 are connected to the motor through the temperature-operated relays 23. The relay comprises a coiled conductor 24 in thermal communication with a thermostatic element, which in the present instance comprises a metallic rod 25 around which the conductor 24, duly insulated, is wrapped and to which it is connected at its end. The lower end of the rod 25 is fixed and is connected to the clip 21 and the upper end is pivoted to a lever 26 which is moved by variations in the length of the rod due to temperature changes. The conductor 24 is connected to the motor 3, preferably through a coil 27 forming part of the solenoid, so that a great excess of current will energize the solenoid sufficiently to trip the switch. The solenoid is provided with a three-phase winding 31, 32, 33, so arranged that two of the windings are always brought into operation to raise the plunger 7. The lever 26 is arranged to engage a contact 34 which is connected to the coil 32 of the solenoid, so that when the current is closed at contact 34, coils 32 and 31 of the solenoid are energized and the plunger is raised and the switch released, opening the circuit. As soon as the switch opens, the solenoid circuit is broken and the latch 6 drops back into position to again receive the switch. The thermal relay 23 is inclosed in a casing 35 of heat-insulating material, so that the temperature of the conductor 24 therein corresponds directly with the temperature of the hottest part of the windings in the motor 3 and the relay is so arranged that it operates to close the contact 26—34 when a certain maximum temperature obtains in the hottest part of the motor winding.

Means are provided for preventing the switch from being closed during the period of high temperature of the relay. Arranged adjacent the switch blades 15 and 17 are fixed plates 36, each of which is provided with a slot 37, concentric with the pivot of the blade and in which there moves a lug 38 secured to the blade. Since the two locking-out means are duplicates and are employed on account of the three-phase arrangement, it will be necessary to describe only one of them; since the other is of the same construction and operation. Projecting into the slot 37 is a spring-pressed latch 39 having a conical or tapered end, so that the lug 38 may readily pass the latch as the switch flies open. Means are provided for locking the latch in position after the lug has passed, so that the lug may not be moved back through the groove. Arranged adjacent the latch is a solenoid 41 having an abutment 42 on its plunger 43, which, when the solenoid is energized, is moved into position behind the latch 39 and prevents it from being moved out of the groove. The solenoid is arranged in parallel with the switch blade 15, that is, it is connected at one end to the pivot of the blade and at the other end to the clip 21, but its resistance is so high with relation to that of the blade, that when the switch is closed, not sufficient current passes through the solenoid to raise the plunger. Arranged adjacent the center switch blade 16 are two separated contact clips 44—45 which are connected respectively by the conductors 46—47 with the two relays. The contact contacts 48 of the two relays. The contact 48 in each relay is arranged adjacent contact 34 and is engaged by the lever 26 simultaneously with contact 34. These clips 44—45 are so placed that they are engaged by the switch blade 16 when the lug on blade 15 has passed the latch 39. Since the switch is released when the lever 26 and the contact 34 are in engagement, the contact of the blade 16 with the clip 44 closes the circuit through the solenoid 41 and causes the latch 39 to be locked in position. It is then impossible to close the switch until the contact at 26—34 is opened and this is not opened until the relay has cooled.

We have described the invention as applied to a motor, but it is to be understood that it is applicable to any type of electrical apparatus in which abnormal temperatures are deleterious to the apparatus or parts thereof.

We claim:

1. A protective device for an electric circuit containing electric apparatus, comprising means operative by an increase in temperature, due to electric current flow in said circuit, for opening the circuit and for preventing the circuit from being subsequently closed until the temperature falls below a predetermined value.

2. A protective device for an electric circuit containing electric apparatus, comprising means including an electric heating element, and controlled by an increase in temperature of the heating element by current flow to a predetermined temperature to open the circuit and prevent the closing of the circuit until the temperature of the heating element falls below a predetermined temperature.

3. A protective device for an electric circuit containing electric apparatus comprising means including an electric heating element, and controlled by an increase in temperature of the heating element by current flow to a predetermined temperature to open the circuit, hold the circuit open until the temperature of the heating element falls to a predetermined temperature and then permit the circuit to be closed.

4. A protective device for an electric circuit containing electric apparatus comprising a heating element, means operative by an increase in temperature of said element to a predetermined temperature to open the circuit, a latch for holding the circuit open, and means operative by said first-mentioned means to release said latch.

5. A protective device for an electric circuit containing electric apparatus comprising an electric heating element, means operative by an increase in temperature of said element by current flow to a predetermined temperature to open the circuit and prevent the circuit from being subsequently closed to operate the apparatus until the temperature of said element falls to a predetermined value.

6. A protective device for an electric circuit containing electric apparatus having a current-carrying winding, comprising an element associated therewith which is heated by the current traversing said winding, and operative by an increase in temperature to a predetermined value to open said circuit, and means controlled by said element for preventing the circuit from being closed until the temperature of said element falls to a predetermined value.

7. A protective device for an electric circuit containing electric apparatus, comprising a switch in said circuit, a heating element in said circuit, means operative by an increase in temperature of the heating element to a predetermined temperature for opening said switch and preventing the switch from being subsequently closed until the temperature falls to a predetermined temperature.

8. A protective device for an electric circuit containing electric apparatus, comprising a switch in said circuit, a heating element in said circuit, means operative by an increase in temperature of the heating element for opening said switch, and a latch controlled by the temperature of the heating element for locking the switch in the open position.

9. A protective device for an electric circuit containing electric apparatus, comprising a switch in said circuit, a heating element in said circuit, means operative by an increase in temperature of the heating element for opening said switch, and a latch operated by the opening of the switch for locking the switch in the open position and releasing the switch when the temperature of the element falls.

10. A protective device for an electric circuit containing electric apparatus, comprising a switch in said circuit, a heating element in said circuit, means operative by an increase in temperature of the heating element for opening said switch, a latch for locking the switch in the open position, and means controlled by temperature of the heating element for releasing said latch.

11. A protective device for an electric circuit containing electric apparatus, comprising a switch in said circuit, a heating element in said circuit, means operative by an increase in temperature of the heating element for opening said switch, a latch arranged to engage the switch in the open position, means for locking the latch in position and means operative by the opening of the switch for a predetermined distance during said increase in temperature to operate said latch-locking means.

12. A protective device for an electric circuit containing electric apparatus, comprising a heating element in circuit with said apparatus, a switch in said circuit, a solenoid controlling said switch, a circuit including said solenoid, means operative by an increase in temperature of said element to a predetermined temperature to control said solenoid circuit to open said switch, and means including said temperature-operated means controlled by the temperature of said element for preventing the closing of the switch when said temperature is above a predetermined value.

13. A protective device for an electric motor, comprising a thermal responsive device influenced by the current traversing said motor, means operated by an increase in temperature of said thermal responsive device to a predetermined temperature to open the circuit, and means controlled by said thermal responsive device for preventing the circuit from being closed until the temperature of the thermal responsive device falls to a predetermined value.

In testimony whereof, we have hereunto set our hands at San Francisco, California, this 28th day of May, 1917.

BENJAMIN M. MOOERS.
LAWRENCE E. WARNER.

In presence of—
H. G. PROST.